Figure 1:
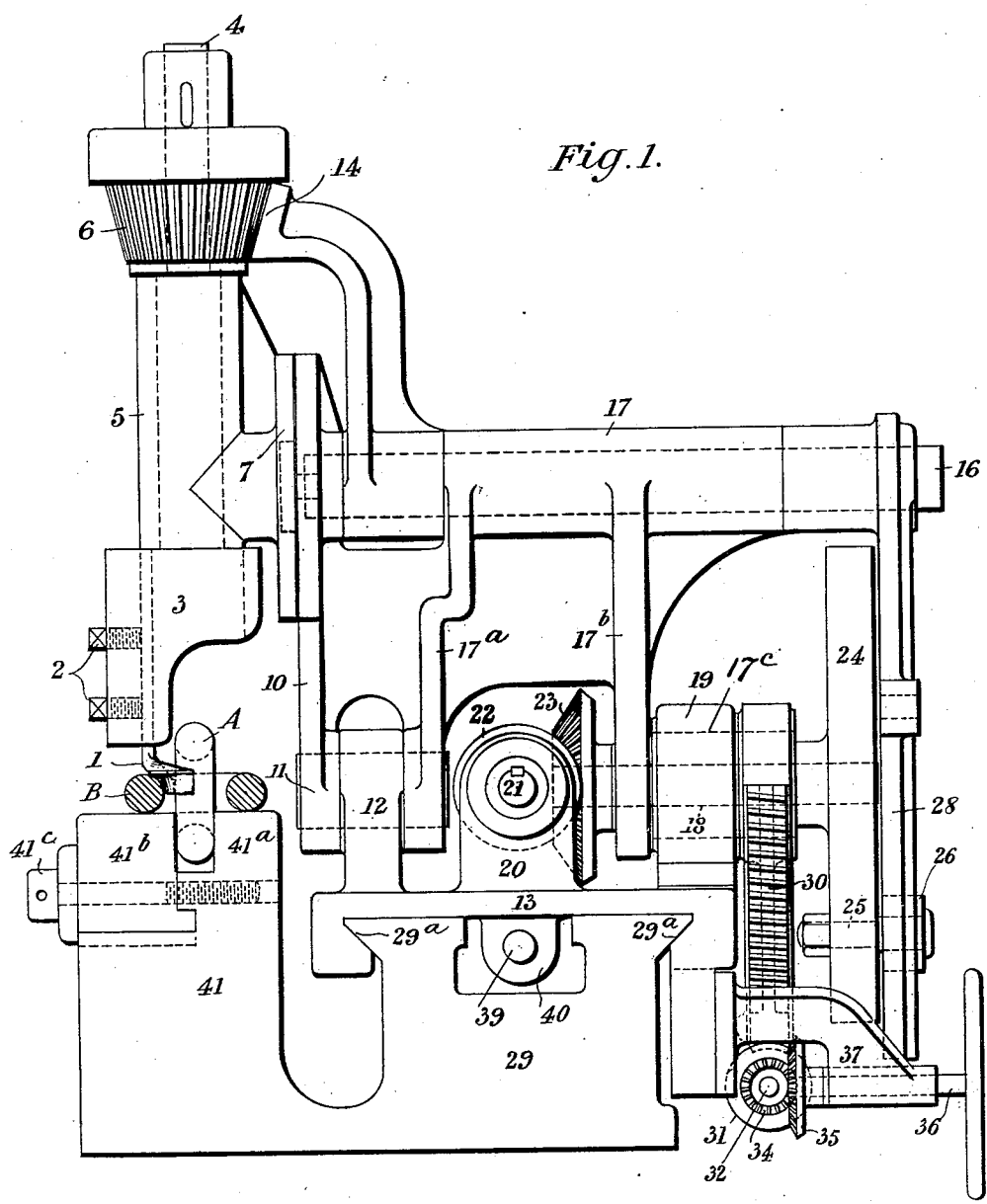

No. 655,383. Patented Aug. 7, 1900.
J. W. WAILES & F. GROSS.
MACHINE FOR MANUFACTURING WELDLESS CHAINS.
(Application filed Dec. 4, 1899.)
(No Model.) 5 Sheets—Sheet 1.

WITNESSES:
Fred White
Rene' Bruine

INVENTORS:
John William Wailes & Felix Gross,
By their Attorneys
Arthur E. Fraser & Co.

No. 655,383. Patented Aug. 7, 1900.
J. W. WAILES & F. GROSS.
MACHINE FOR MANUFACTURING WELDLESS CHAINS.
(Application filed Dec. 4, 1899.)
(No Model.) 5 Sheets—Sheet 2.

WITNESSES:
INVENTORS:
John William Wailes and Felix Gross,
By their Attorneys:

No. 655,383. Patented Aug. 7, 1900.
J. W. WAILES & F. GROSS.
MACHINE FOR MANUFACTURING WELDLESS CHAINS.
(Application filed Dec. 4, 1899.)
(No Model.) 5 Sheets—Sheet 4.
Fig. 4.
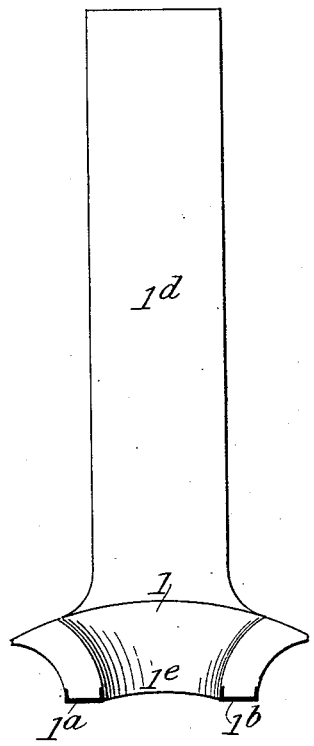
Fig. 4ª
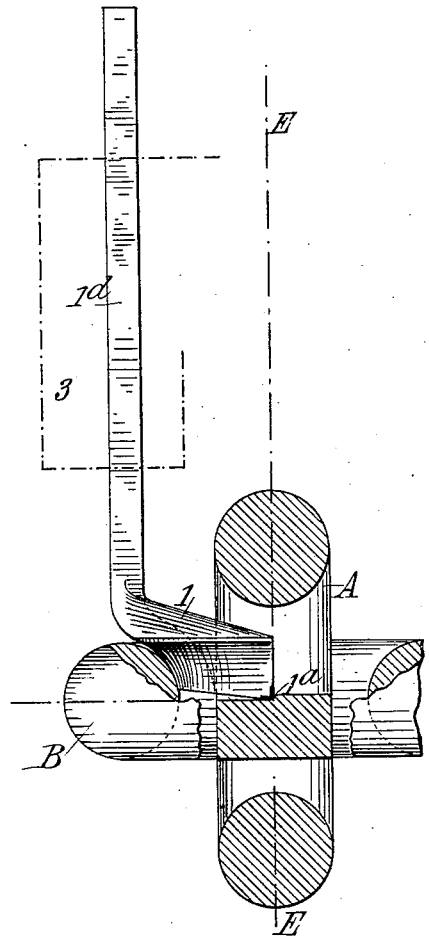
Fig. 5.
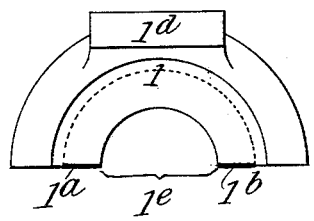
WITNESSES:
Fred White
Thomas F. Wallace
INVENTORS:
John William Wailes and Felix Gross,
By Attorneys,
Arthur C. Fraser & Co

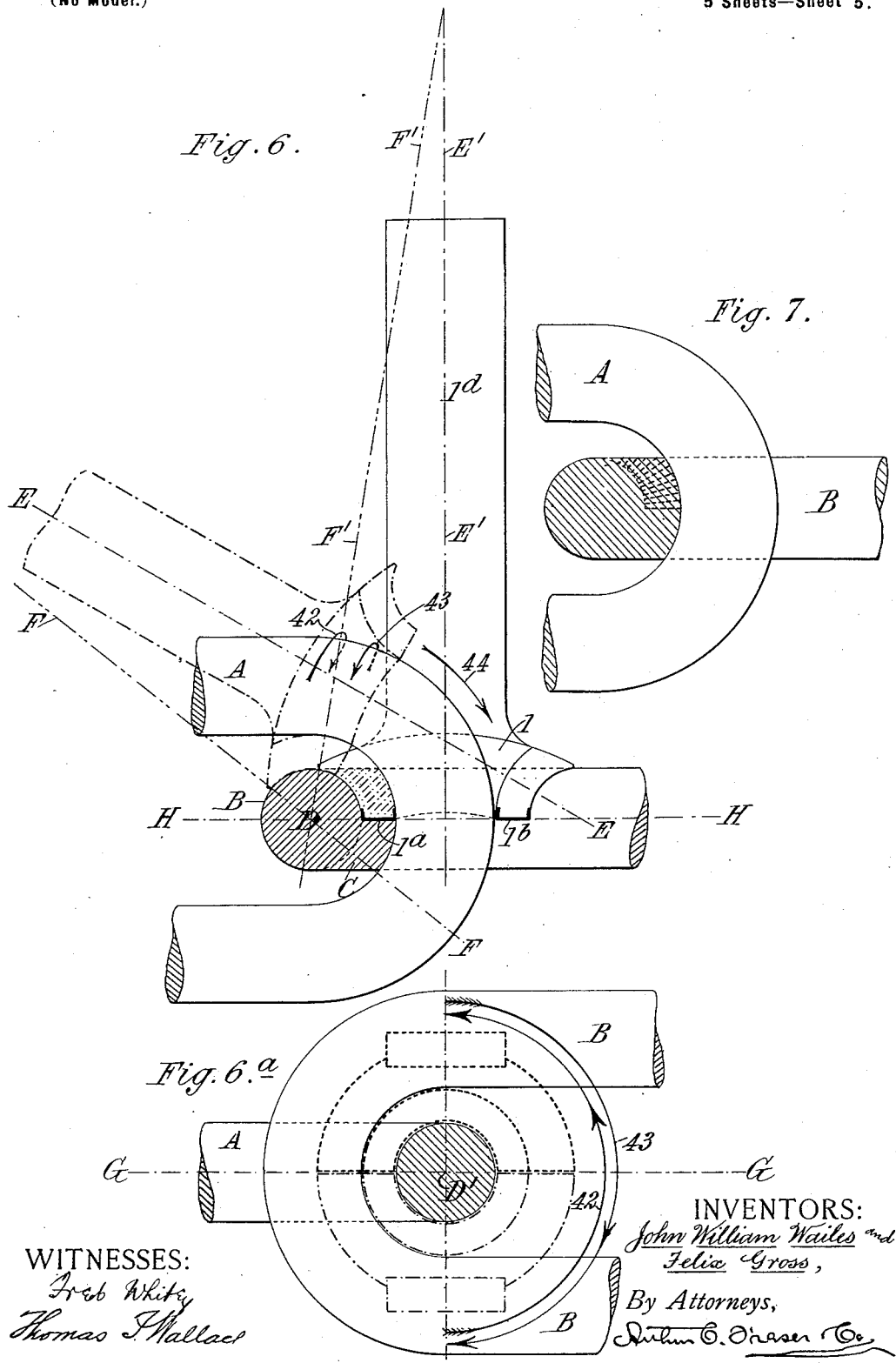

UNITED STATES PATENT OFFICE.

JOHN WILLIAM WAILES AND FELIX GROSS, OF NEWCASTLE-UPON-TYNE, ENGLAND.

MACHINE FOR MANUFACTURING WELDLESS CHAINS.

SPECIFICATION forming part of Letters Patent No. 655,383, dated August 7, 1900.

Application filed December 4, 1899. Serial No. 739,129. (No model.)

*To all whom it may concern:*

Be it known that we, JOHN WILLIAM WAILES and FELIX GROSS, of 5 Collingwood street, Newcastle-upon-Tyne, England, have invented certain new and useful Improvements in Machines for the Manufacture of Weldless Chains, of which the following is a specification.

In the manufacture of weldless chains from a solid bar of cruciform or other suitable section it has been found desirable to first reduce the bar for ordinary chains into a series of disks of suitable uniform thickness connected with each other at right angles, each disk containing sufficient metal to make a link of the size required and in the case of studded cable chains containing also the metal for the solid stud. In the latter case it has been preferred to make chain-bars of double connected disks—that is to say, disks each composed of two circular ends connected together by a slightly-contracted intermediate portion. By proceeding in this manner there is no surplus material left to be removed as waste on the outside between the disks, and the material hitherto wasted in outside fins or webs becomes part of the chain-links. These single or double disks are then enlarged hot to the required size by means of rolls, press-dies, or hammer-tools, which act by squeezing the central portion of each single disk into a thin central web for the manufacture of ordinary chains and by similarly squeezing the central portion of each of the two circular ends of the double disks in the case of studded cable-chains. The outside circumferential measurement of these enlarged disks is approximately equal to the outside circumferential measurement of the finished links. Having so formed the disks and having removed the central webs in such a manner that one circular link end passes through the circular link end of the adjoining link concentrically to said circular end and at right angles to the plane of the said adjoining link, the metal forming still the connection between the insides of the ends of every two adjoining links has now to be removed.

The present invention consists of a machine for effecting the last-named object—that is to say, the removal of the metal forming the connection between the insides of the ends of every two adjoining links. In this machine is an annular cutting-tool oscillating on a spindle. This annular cutting-tool has a gap to allow of its passing over the link presenting its edge to it and has its inside cutting edge operating around this link. The outside of the tool has the form of the circular tapering depression produced in enlarging the disk and reducing the center to a web. The oscillating spindle is preferably fixed on a transverse axis corresponding in center to the circular form of the link around which the annular cutter operates, and the cut will advance radially around the link until it arrives at or near the center.

Figure 2:
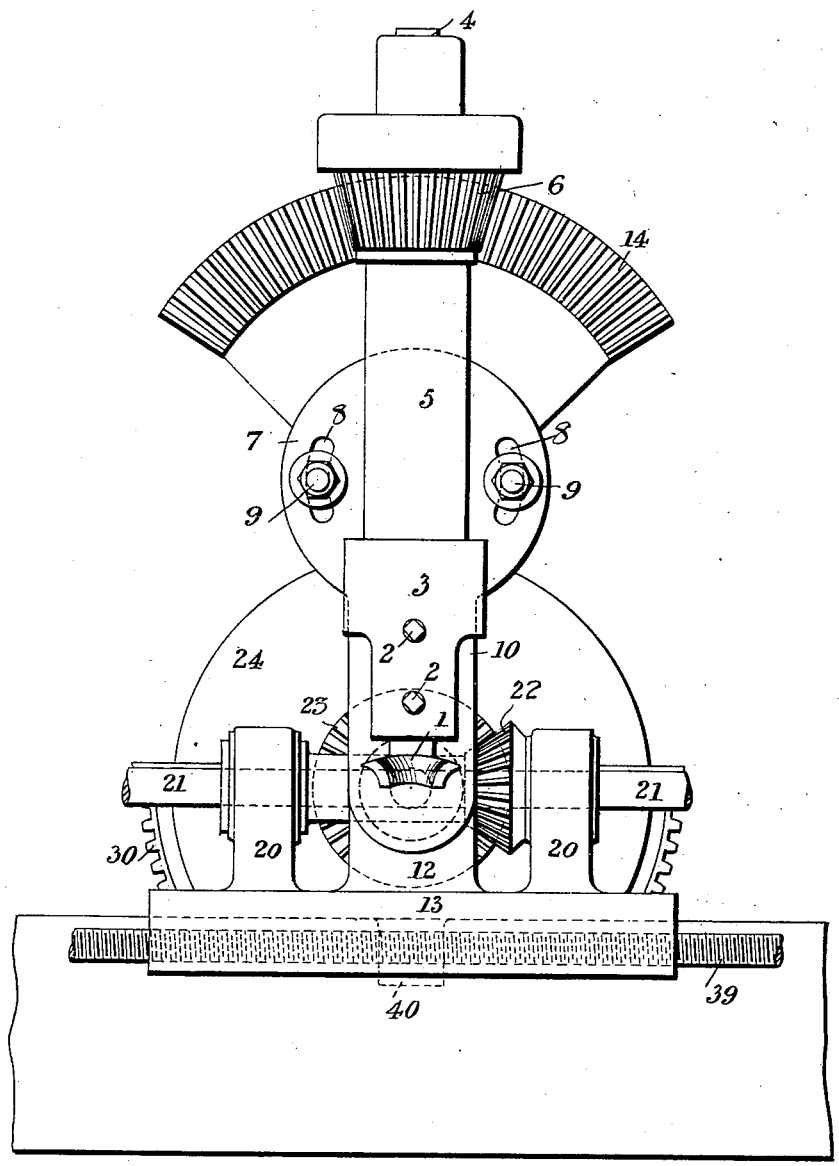
Figure 3:
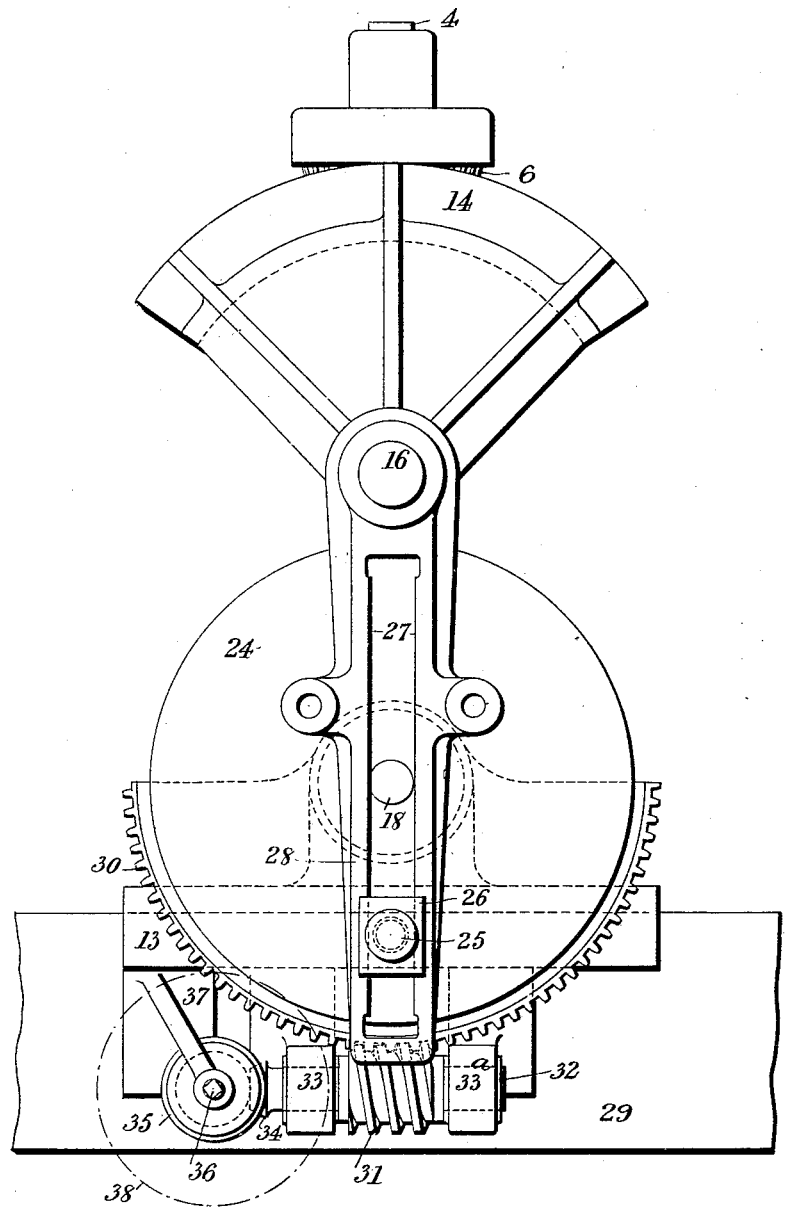

In the accompanying drawings, Figure 1 is a side elevation of a machine constructed according to our invention. Fig. 2 is a front elevation of the same. Fig. 3 is a rear elevation of the same. Fig. 4 is a front elevation of the tool or cutter. Fig. 4ᵃ is a side elevation of such tool in the operation of cutting the links apart, the links being shown in sectional elevation. Fig. 5 is a plan of the tool or cutter removed. Fig. 6 is a sectional elevation, and Fig. 6ᵃ a sectional plan, showing the cutter in operation upon two adjoining links; and Fig. 7 is a sectional elevation of two connected links, illustrating the successive cuts made by the tool in removing one-half of the connecting-web of metal.

1 is the annular tool or cutter, hereinafter fully described with reference to Figs. 4, 4ᵃ, and 5. It is clamped by means of screws 2 in a holder 3, mounted on the lower end of the oscillating spindle 4. The latter is adapted to be revolved in the head 5 by means of a crown-wheel 6, fixed on the upper end of the spindle. The head 5 is formed with a circular rear portion or flange 7, formed with elongated arc-shaped holes 8, through which pass clamping-bolts 9, by means of which the head 5, and consequently also the spindle with its tool 1, can be fixed within limits at any desired suitable angle for operating upon the links to a link 10, pivoted on a pin 11, carried in a bearing 12, forming part of the sliding carriage 13 of the machine.

Rotary motion is imparted to the wheel 6 on the spindle 4 by means of a quadrant-wheel 14, which is keyed on a shaft 16, carried in a bearing 17, supported by downward extensions 17$^a$ 17$^b$. The extension 17$^a$ is mounted on the pivot-pin 11 and the extension 17$^b$ is mounted on or forms part of a sleeve 17$^c$, surrounding loosely a shaft 18, arranged in line with the pivot-pin 11. The sleeve 17$^c$ is carried in a bearing 19, forming part of the carriage 13. Consequently the link 10, the bearing 17, the downward extensions 17$^a$ 17$^b$, and the sleeve 17$^c$ constitute together a pivoted frame which is capable of being tilted about the transverse common axis of the pivot-pin 11 and the shaft 18 as a center. In the bearing 20, also forming part of the carriage 13, is carried the driving-shaft 21, on which is keyed a bevel-wheel 22, gearing with a bevel-wheel 23, keyed on the inner end of the shaft 18. On the outer end of the shaft 18 is keyed a disk 24, in which is fixed eccentrically a stud 25, that carries loose on it a slide-block 26, adapted to work in a slot or guideway 27, formed in an arm 28, keyed on the outer end of the shaft 16. The relative proportions are such that at each revolution of the disk 24 the spindle 16 will be oscillated through an arc slightly greater than a semicircle in each direction about its axis. The carriage 13 is arranged to slide on V guides or slides 29$^a$, formed on the fixed or main frame 29 of the machine.

On the sleeve 17$^c$, between the bearing 19 and the disk 24, is keyed a worm-wheel 30, gearing with a worm 31, keyed on a shaft 32, which is carried in bearings 33 33$^a$, formed on the carriage 13. On the inner end of this shaft 32 is keyed a bevel-wheel 34, gearing with a bevel-wheel 35, keyed on a spindle 36, which is carried in a bracket 37, bolted to the carriage 13. On the outer end of the spindle 36 is fixed a hand-wheel 38, by actuating which the pivoted machine-frame is tilted in one or the other direction about the axis of the shaft 18, and whereby the feed of the tool 1 is produced. The carriage 13 is traversed along the main framing 29 of the machine by means of a guide-screw 39, which works in a nut 40, formed on the under side of the carriage 13.

The links A B to be operated on by the cutter 1 are held between the fixed jaw 41$^a$ and the movable jaw 41$^b$ of a vise 41, which may be fixed to the main frame 29. The movable jaw of the vise is operated by means of a handle 41$^c$.

The planing tool or cutter 1, Figs. 4, 4$^a$, and 5, is of semicircular annular shape concentric to the axis of the spindle 4 and has in cross-section (indicated by dotted lines in Fig. 4$^a$) the form of half the circular tapering depression produced in cutting away the metal that forms the connection C between two adjoining link ends. It has a gap 1$^e$ to allow of its passing around the link A, presenting its edge to it, and its two rectangular edges 1$^a$ and 1$^b$ are formed to cut as planing-cutters. The tool has a shank 1$^d$ for clamping in the holder 3. A suitable amount of clearance is provided at the sides and the back of each cutting edge. The manner of operating with this machine is as follows:

Referring to Figs. 6 and 6$^a$, the chain-bar is fixed horizontally in the vise 41 in a position in which the center D of the horizontal link B is in line with the axis of the shaft 18, and the tool-spindle 4 is set with its center line tangential to the vertical semicircle, with the radius D D' struck from the center D. The machine-frame is then tilted over on this center by means of the feed-wheel 38 to bring the tool 1 into the position in which it can commence to cut away the connection C. In Fig. 6, in which this position of the tool is indicated by dash-dotted lines, E E represent the center line of the spindle 4, and F F represent the center line of the tilting frame of the machine. The necessary angle between the center lines E E and F F is produced by fixing the head 5 with the corresponding angular displacement on the machine-frame. The driving-shaft 21 is then set in motion, whereby the tool 1 is caused to rock on its axis E E around the circular link end A through a complete semicircle at each stroke, first in one direction and then in the opposite direction, as indicated by the curved arrows 42 and 43. (In Fig. 6$^a$ the positions of the tool at the ends of the strokes are indicated by dash-dotted and thick-dotted lines, respectively.) In the semicircular stroke of the tool in the direction of the arrow 42 the cutting edge 1$^a$ planes away a shaving from the upper surface of the connection C as far as the central vertical plane (indicated by the line G G) of the said connection, and in the semicircular stroke of the tool in the opposite direction (i. e., in the direction of the arrow 43) a similar shaving is planed away from the opposite half of the connection C as far as the plane G G by the cutting edge 1$^b$. During this oscillatory cutting motion of the tool 1 the wheel 38 is operated to tilt the machine-frame on D as a center, so as to feed the tool 1 in a vertical plane in a circular manner along the vertical link end A, as indicated by the arrow 44, until the tool has cut away the upper half of the connection C down to the central horizontal plane H H of the link B. (This position of the tool 1 is shown in full lines in Fig. 6, in which the corresponding positions of the center lines of the tool and of the machine-frame are marked, respectively, E' E' and F' F'.) The successive cuts made by the tool are shown in dotted lines in Fig. 7. Fig. 4$^a$ shows the tool in the act of completing its last stroke in the direction of the arrow 42 in Fig. 6$^a$. On its reverse stroke in the direction of the arrow 43 the cutting edge 1$^b$ will complete the cutting operation by shaving away the remaining portion of the upper half of the metal connection. The machine is now stopped, and then it is moved along the chain-bar by means of the screw 39 until the center of the shaft 18 has been brought in line with the corresponding center D of the other end of the link B, whereupon the machine is tilted in the opposite direction to allow the tool 1 to operate in the same manner as just hereinbefore described. When the upper halves of the connections C of the connected ends of all the links of the chain-bar have been cut away, the chain-bar is turned over and the remaining halves of the connections C of the connected links are cut away in the same way, whereby the hitherto rigidly-connected links are now detached or separated from each other, and the chain-bar has now been cut up by the operation of the machine into a series of freely-movable links constituting a chain or cable. Links of different sizes will require tools of corresponding dimensions, and the angle between the center lines E E and F F must be varied acordingly.

Although the particular form of the cutter or tool shown is the preferred form, it is obvious that we may use tools having any suitable form of cutting edge operating in the manner indicated. Any number of such cutters may operate at one time upon a chain-bar from one side or from opposite sides. Also instead of the ends of the links being true circles, as shown, we may operate the cutter on links which differ somewhat from this form, so long as the axis of the cutter is kept to the line of the link operated upon. This may be done by means of dies or guides, which will guide the cut to the particular form of the link.

When the machine above described has operated upon all the links, they are all detached or separated from each other and constitute a chain or cable. They are perfect in section, but circular in shape at the ends. If it should be required to elongate them, this can be done by a further operation—viz., by pressing the link hot in suitable dies to the required oval shape by elongating them.

What we claim, and desire to secure by Letters Patent, is—

1. A machine for removing the inside connecting portion between two adjoining links, comprising a cutting-tool, and means for causing a cutting movement of said tool relatively to the work about an axis approximately concentric with one link, and a feeding movement thereof approximately concentric with the other link.

2. A machine for removing the inside connecting portion between two adjoining links, comprising a cutting-tool, means for imparting a cutting movement to said tool about an axis approximately concentric with one link, and means for imparting a relative feed movement of the tool and work about an axis approximately concentric with the other link.

3. In a machine for removing the connection left between the insides of the ends of two adjoining links of a weldless-chain bar, a cutting-tool, means for imparting a cutting movement to said tool about an axis approximately concentric with the one link, and a feed movement approximately concentric with the other link, substantially as set forth.

4. In a machine for removing the connection left between the insides of the ends of two adjoining links of a weldless-chain bar, the combination of a spindle oscillating on an axis corresponding in center to the form of the link ends to be operated on, with a milling cutter or tool carried by said spindle and operating with its outside and inside edges upon the connected surfaces of the links, substantially as set forth.

5. In a machine for removing the connection left between the insides of the ends of two adjoining links of a weldless-chain bar, a milling-cutter of annular form shaped to fit the internal space between the insides of the connected link ends and having inside and outside cutting edges, and a gap to receive the link end, substantially as set forth.

6. In a machine for removing the connection left between the insides of the ends of two adjoining links of a weldless-chain bar, the combination of a pivoted adjustable head, an oscillating spindle carried by said head, an annular cutter carried by said spindle, means for oscillating said spindle and means for feeding said cutter to its work, substantially as set forth.

7. In a machine for removing the connection left between the insides of the ends of two adjoining links of a weldless-chain bar, the combination of a pivoted head radiating from the center of the horizontal link to be operated on, an oscillating spindle carried by said head and an annular cutter carried by said spindle, with a rotary driving-shaft, a crank-disk, a slotted arm operated by said crank-disk, means for varying the angular position of the pivoted head, means for transmitting the rotary motion of said driving-shaft to said crank-disk, means for transmitting the oscillatory motion of said slotted arm to the said oscillating spindle, and means for feeding said cutter to its work, substantially as set forth.

In witness whereof we have hereunto signed our names in the presence of two subscribing witnesses.

JOHN WILLIAM WAILES.
FELIX GROSS.

Witnesses:
H. NIXON,
H. IRWIN.